United States Patent
Hoashi et al.

(10) Patent No.: US 7,158,217 B2
(45) Date of Patent: Jan. 2, 2007

(54) VEHICLE RADAR DEVICE

(75) Inventors: Yoshiaki Hoashi, Kariya (JP);
Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 208 days.

(21) Appl. No.: 10/682,882

(22) Filed: Oct. 14, 2003

(65) Prior Publication Data

US 2004/0169840 A1   Sep. 2, 2004

(30) Foreign Application Priority Data

Nov. 28, 2002 (JP) ............................. 2002-346282

(51) Int. Cl.
*G01C 3/08* (2006.01)

(52) U.S. Cl. .................. 356/4.01; 356/5.01; 356/4.07; 342/70; 342/71; 342/72

(58) Field of Classification Search .............. 356/3.01, 356/3.02, 3.03, 3.04, 3.09, 3.11, 4.01; 342/70, 342/71, 72, 94–96, 159, 110, 112
See application file for complete search history.

(56) References Cited

U.S. PATENT DOCUMENTS

| | | | |
|---|---|---|---|
| 4,006,484 A * | 2/1977 | Nobusawa | 396/240 |
| 4,673,937 A * | 6/1987 | Davis | 342/72 |
| 5,285,390 A * | 2/1994 | Haseda et al. | 701/41 |
| 5,565,870 A | 10/1996 | Fukuhara et al. | |
| 5,748,141 A * | 5/1998 | Hoess | 342/109 |
| 6,018,311 A | 1/2000 | David | |
| 6,204,755 B1 | 3/2001 | Kikuchi | |
| 6,307,622 B1 * | 10/2001 | Lewis | 356/4.01 |
| 6,794,987 B1 * | 9/2004 | Schiffmann et al. | 340/435 |
| 6,819,407 B1 | 11/2004 | Arita et al. | |
| 2003/0085834 A1 | 5/2003 | Okamura | |

FOREIGN PATENT DOCUMENTS

| | | |
|---|---|---|
| JP | A-H07-191148 | 7/1995 |
| JP | A-2000-9841 | 1/2000 |
| JP | A-2002-40139 | 2/2002 |

* cited by examiner

*Primary Examiner*—Thomas H. Tarcza
*Assistant Examiner*—Luke Ratcliffe
(74) *Attorney, Agent, or Firm*—Posz Law Group, PLC

(57) ABSTRACT

In a vehicle radar device, a predetermined number of received light signals output based on a predetermined number of laser beams radiated from a radar sensor are integrated by an integrator to produce an integrated signal. Integration of the predetermined number of received light signals helps amplify the received light signal components corresponding to the waves reflected by reflecting objects, making it possible to improve the sensitivity for detecting the waves reflected by the reflecting object. There are set a plurality of ranges of the received light signals to be integrated, each being shifted by one received light signal. This minimizes a drop in the angular resolution based on the integrated signals.

13 Claims, 6 Drawing Sheets

VEHICLE RADAR DEVICE

CROSS REFERENCE TO RELATED APPLICATION

This application is related to and incorporates herein by reference Japanese Patent Application No. 2002-346282 filed on Nov. 28, 2002.

FIELD OF THE INVENTION

This invention relates to a vehicle radar device, which radiates a plurality of transmission waves in the forward lateral direction, that is, within a range of a predetermined angle in at least a direction of the vehicle width, and detects objects based on received signals that vary depending upon the intensities of the reflected waves when the reflected waves are received in response to the transmitted signals.

BACKGROUND OF THE INVENTION

A conventional vehicle radar device radiates transmission waves such as light waves or millimeter waves toward the front of the vehicle and detects objects in front of the vehicle based on the reflected waves as disclosed in, for example, JP-A-2002-40139. The device of this kind is used for a device that generates an alarm upon detecting a distance to the preceding vehicle or a device which controls the vehicle speed so as to maintain a predetermined distance to the preceding vehicle.

In the above vehicle radar device, the direction of radiating the laser beam emitted from a laser diode is varied by using a polygonal mirror that is rotated, thereby to radiate a plurality of laser beams over a predetermined angular range in the direction of width and height of the vehicle. When the laser beams are reflected by objects, the reflected beams are received through a light-receiving lens. The reflected beams that are received are guided to a light-receiving element which then produces voltage signals corresponding to the intensities of the received beams.

The distance to the reflecting object is detected based on a time interval up to when the voltage signal becomes greater than a reference voltage from when the laser beam is radiated, and a position, too, is detected in the direction of vehicle width and in the direction of vehicle height based on the angle of irradiation of the laser beams.

As described above, the objects to be detected by the vehicle radar device are the preceding vehicles, etc. that are present ahead. Usually, a preceding vehicle has reflectors on the rear surface thereof to reflect the transmission waves such as laser beams, and the vehicle body, too, has a relatively high reflection intensity though it is not as high as that of the reflectors. Therefore, the vehicle radar device is capable of detecting the preceding vehicles that are traveling ahead to maintain distances of not shorter than 100 meters.

However, the output intensity of the transmission waves such as laser beams is limited due to a variety of reasons, and a limitation is inevitably imposed on the detectable range of distance to the preceding vehicles.

Besides, when mud, snow, etc. adhere to the rear surfaces of the preceding vehicles, the intensity of laser beams reflected by the preceding vehicles decreases. When the light signals are received in this case, it becomes difficult to distinguish noise components generated due to various factors over the received light signal components having intensities corresponding to the light reflected by the preceding vehicles. As a result, the detectable distance of the radar device becomes short.

SUMMARY OF THE INVENTION

It is therefore an object of the present invention to provide a vehicle radar device, which extends the detectable distance by improving the sensitivity for detecting the reflection waves reflected by objects, and suppresses a decrease in the detectable distance to the preceding vehicles that have a decreased reflecting property.

A vehicle radar device of the invention integrates a predetermined number of received signals that are output based on a predetermined number of transmission signals radiated neighboring to each other, and outputs an integrated signal. Therefore, even when the individual received signal components corresponding to the intensities of the reflected waves have small intensities, the intensities of the received signal components corresponding to the reflected waves from objects are amplified through the integration of a predetermined number of received signals. Noise components, on the other hand, are superposed in a random fashion on the received signals due to various factors, and can be amplified to only a small degree even if a predetermined number of received signals thereof are integrated. Therefore, the integrated signals feature an improved S/N ratio of the received signal components corresponding to the waves reflected by the reflecting objects. Upon detecting the reflecting objects based on the integrated signals, therefore, the distance for detecting the reflecting objects can be extended. Further, a decrease in the detectable distance can be suppressed even when the intensity of reflection by the reflecting objects is decreasing.

Here, however, when the received signals that are output are simply grouped by a predetermined number to find an integrated signal thereof, the angular resolution based on the integrated signal decreases down to a resolution that is obtained by multiplying the angular resolution of the individual received signals by a predetermined number of times.

Therefore, in setting a predetermined number of received signals output based on the predetermined number of transmission signals radiated neighboring each other as a range of the received signals to be integrated, there are set a plurality of ranges of the received signals to be integrated while shifting the received signals belonging to the ranges of the received signals to be integrated by a number of the received signals smaller than the predetermined number, so that some of the received signals belong, in an overlapped manner, to the plurality of ranges of the received signals to be integrated. Thus, the integrated signal can retain higher angular resolution with respect to the predetermined number of the received signals, while integrating the received signals to calculate the integrated signal. Therefore, in detecting the reflecting objects, the detecting capability or accuracy can be improved while a decrease in the angular resolution is suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
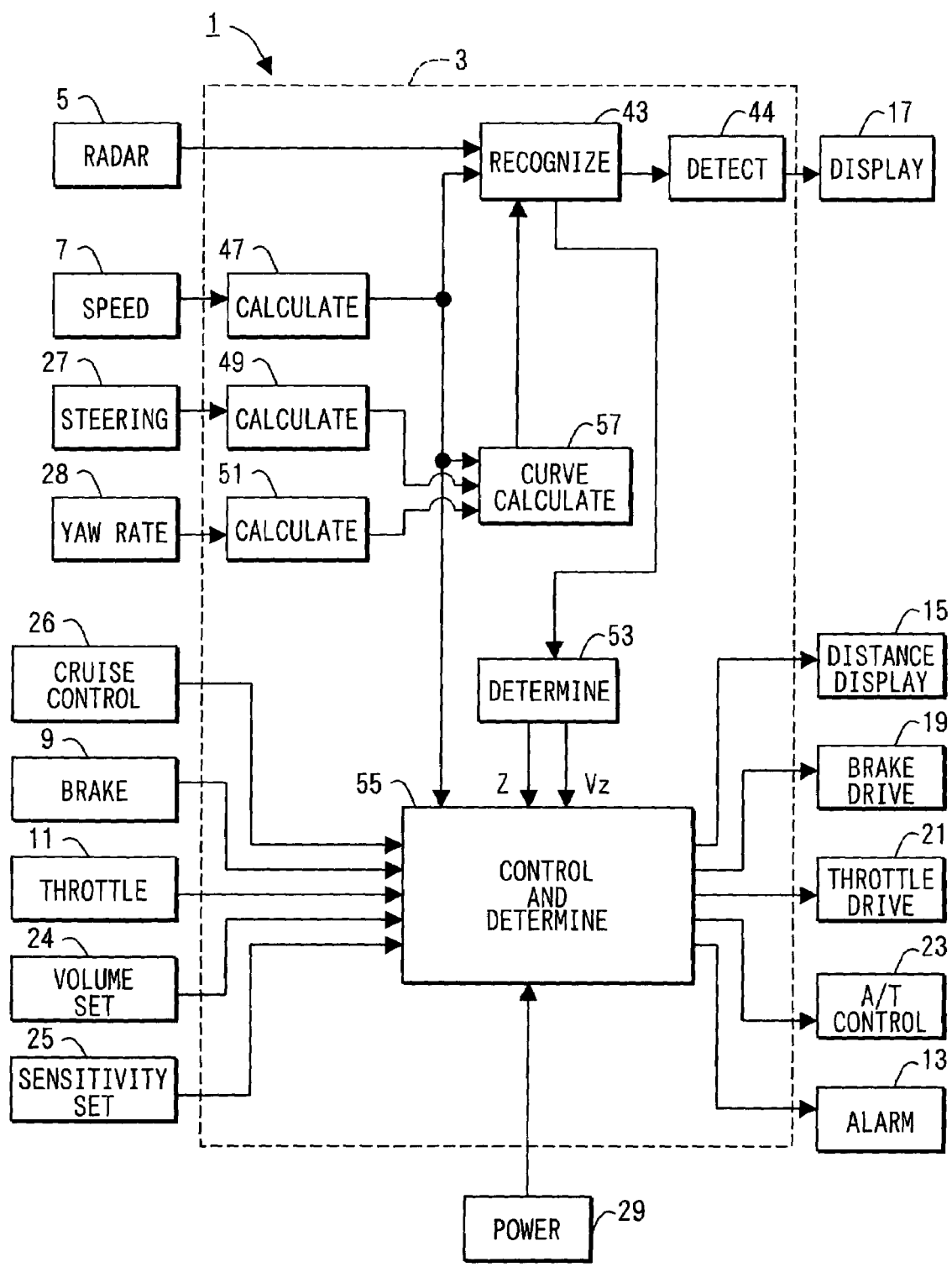
FIG. 1 is a block diagram illustrating a device for controlling a vehicle to which the invention is applied.

According to an embodiment of the present invention shown in FIG. 1, a vehicle radar device is applied to a vehicle control device 1 which operates to produce an alarm when there is an object in a region to be alerted based on a result detected by the vehicle radar device, and operates to control the vehicle to maintain a predetermined distance relative to the preceding vehicle.

The vehicle control device 1 is composed of a recognition/inter-vehicle distance control ECU 3 as a center. The recognition/inter-vehicle distance control ECU 3 is composed of a microcomputer, and includes an input/output interface (I/O), various drive circuits and detector circuits. Those hardware construction is known and hence not described here in detail.

The recognition/inter-vehicle distance control ECU 3 receives detection signals from a laser radar sensor 5 which is a vehicle radar device, a vehicle speed sensor 7, a brake switch 9 and a throttle opening sensor 11, and sends drive signals to an alarm sound generator 13, a distance display 15, an abnormal sensor display 17, a brake drive unit 19, a throttle drive unit 21 and to an automatic transmission (A/T) controller 23. To the recognition/inter-vehicle distance control ECU 3, further, there are connected an alarm sound volume-setting unit 24 for setting the volume of alarm sound, an alarm sensitivity-setting unit 25 for setting the sensitivity in the alarm determination processing, a cruise control switch 26, a steering sensor 27 for detecting the amount of operating a steering wheel that is not shown, and a yaw rate sensor 28 for detecting the yaw rate occurring in the vehicle. The recognition/inter-vehicle distance control ECU 3 further includes a power source switch 29, and starts executing predetermined processing upon the turn-on of the power source switch 29.

Figure 2A:
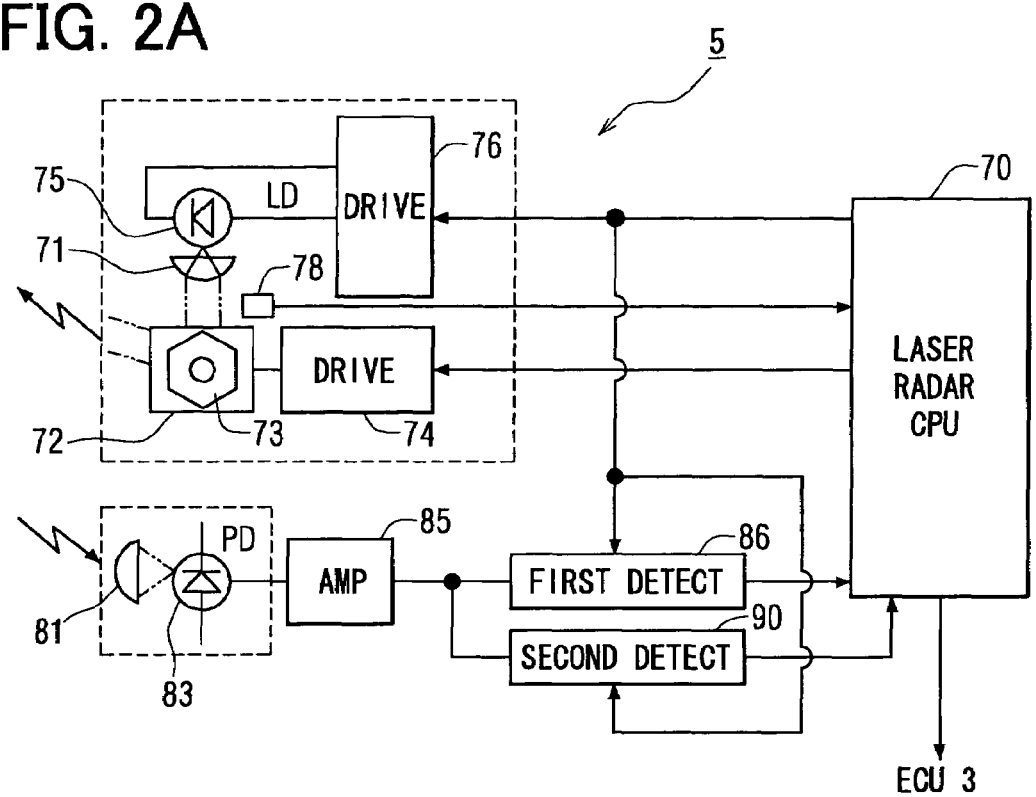
FIG. 2A is a diagram illustrating a laser radar sensor.

As shown in FIG. 2, the laser radar sensor 5 is constructed generally with a light-emitting unit, a light-receiving unit and a laser radar CPU 70. The light-emitting unit includes a semiconductor laser diode 75 which radiates a pulse-like laser beam through a light-emitting lens 71 and a scanner 72.

The laser diode 75 is connected to the laser radar CPU 70 through a laser diode drive circuit 76, and radiates (emits) a laser beam in response to a drive signal from the laser radar CPU 70. The scanner 72 includes a polygonal mirror 73 that rotates about a vertical axis. When the drive signal from the laser radar CPU 70 is input through a motor drive unit 74, the polygonal mirror 73 is rotated by the driving force of a motor that is not shown. The rotational position of the motor is detected by a motor rotational position sensor 78, and is output to the laser radar CPU 70.

The polygonal mirror 73 of the embodiment has six mirrors with different plane tilting angles, and is capable of producing a laser beam so as to discretely scan over ranges of predetermined angles in the lateral and vertical directions, that is, in the direction of vehicle width and in the direction of vehicle height. The laser beam is thus scanned in a two-dimensional manner.

Figure 3:
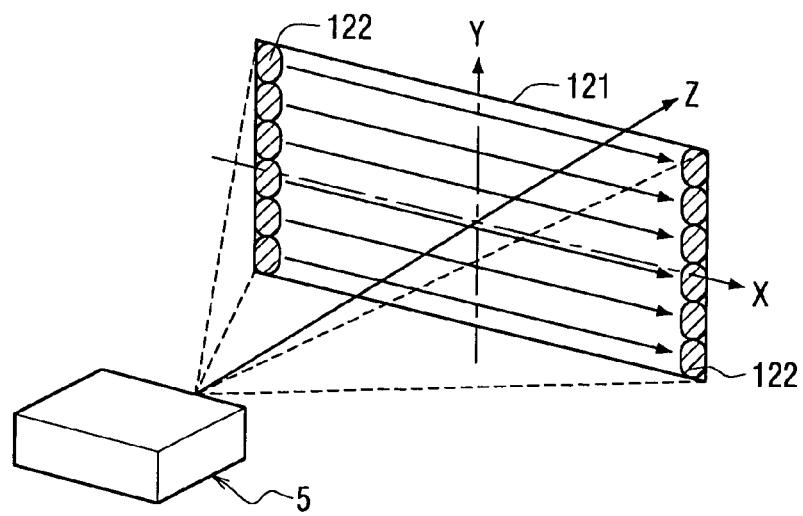
FIG. 3 is a perspective view illustrating a region radiated by the laser radar sensor.

The scanning pattern will now be described with reference to FIG. 3 which illustrates a case where a laser beam pattern 122 is emitted to the right end and to the left end only within a measurable area 121. The patterns in the intermediate portions are omitted. In FIG. 3, the projected laser beam pattern 122 is nearly of an elliptic shape. Not being limited thereto, however, the projected laser beam pattern 122 may be of a rectangular shape or the like. In addition to using the laser beam, there can be further used electromagnetic waves such as millimeter waves or ultrasonic waves. Not being limited to the scanning system, further, there may be employed a system capable of measuring two azimuths in addition to the distance.

When the direction of radiation is the Z-axis, the laser beam is so radiated as to successively scan within an X-Y plane perpendicular to the Z-axis. In this embodiment, the Y-axis which is the direction of vehicle height (vertical direction) is referred to as the reference direction, and the X-axis which is the direction of vehicle width (lateral direction) is referred to as the scanning direction. The scanning area in which the laser beam effects the two-dimensional scanning is about 36 degrees (0.08 deg×451 points) in the X-axis direction and is about 4 degrees (0.7 deg×6 lines) in the Y-axis direction. Further, the scanning direction is from the left to the right in the X-axis direction in FIG. 3, and is from the upper side to the lower side in the Y-axis direction in FIG. 3.

First, the laser beam is successively radiated along a first scanning line at the uppermost position in the Y-axis direction from the left toward the right every other 0.08° in the X-axis direction. Next, similarly, along a second scanning line which is the next column from the uppermost line in the Y-axis direction, the laser beam is successively radiated every other 0.08° in the X-axis direction. Thus, the laser beam is similarly radiated up to the sixth scanning line. Therefore, a plurality of laser beams are radiated for each of the scanning lines from the first scanning line up to the sixth scanning line.

When the laser beam that is reflected is received upon radiating the laser beam onto the above scanning area, there are obtained scanning angles $\theta x$ and $\theta y$ representing angles of radiating the laser beams and a distance L to an object that is measured. The two scanning angles $\theta x$ and $\theta y$ are such that the longitudinal scanning angle $\theta y$ represents an angle between the Z-axis and a line along which the laser beam is projected onto the Y-Z plane, and the transverse scanning angle $\theta x$ represents an angle between the Z-axis and a line along which the laser beam is projected onto the X-Z plane.

Referring again to FIG. 2A, the light-receiving unit of the laser radar sensor 5 includes a focusing lens 81 for focusing the laser beam reflected by an object that is not shown, and a light-receiving element (photo detector PD) 83 that produces a voltage (received light signal) corresponding to the intensity of the reflected light that is focused. The received light signal produced by the light-receiving element 83 is amplified through an amplifier 85, and is input to a first detector circuit 86 that detects the reflecting object based upon the individual received light signals and to a second detector circuit 90 that integrates a predetermined number of received light signals and detects the reflecting object based on the integrated signal. The constructions and operations of the first detector circuit 86 and of the second detector circuit 90 will now be described.

Figure 2B:
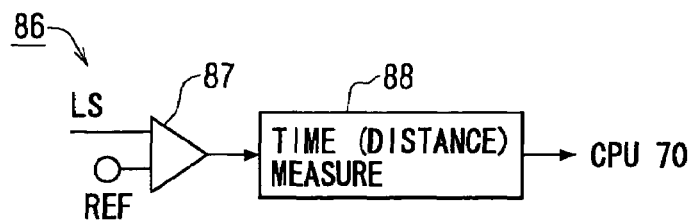
FIG. 2B is a diagram illustrating a first detector circuit in the laser radar sensor.

Referring to FIG. 2B, the first detector circuit includes a comparator 87 for comparing the individual light signals LS that are input with a reference voltage V0, and a time measuring circuit 88 for calculating the distance L to the reflecting object based on the output of the comparator 87.

The comparator 87 compares the received light signal output from the amplifier 85 with the reference voltage, and outputs a comparison signal to a time measuring circuit 88 when the received light signal LS is greater than the reference voltage V0.

Figure 4A:
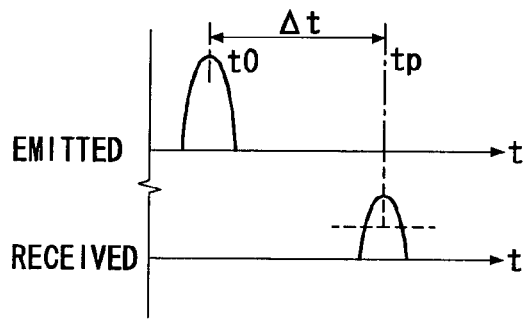
FIG. 4A is a diagram of waveforms illustrating a principle for detecting the distance.
Figure 4B:
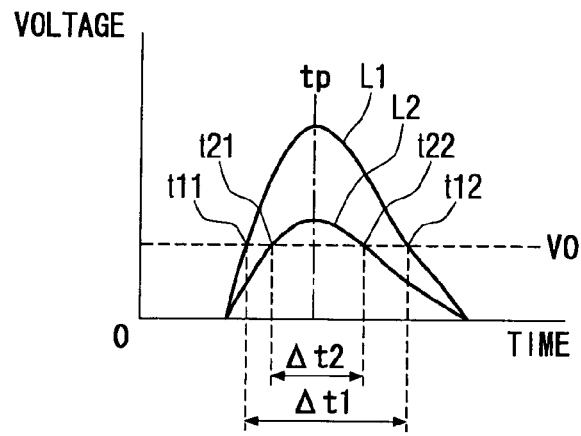
FIG. 4B is a diagram of waveforms illustrating a method of calculating peak values in received light signals.

Based on the comparison signal from the comparator 87, the time measuring circuit 88 detects rising times (t11, t21) when the received light signal LS exceeds the reference voltage V0 and falling times (t12, t22) when the received light signal becomes smaller than the reference voltage V0 as shown in FIG. 4B. Then, a time tp of generating a peak value is calculated based on the rising time and the falling time.

Here, FIG. 4B illustrates received light signals L1 and L2 due to two reflected light beams having different intensities. In FIG. 4B, a curve L1 represents a received light signal due to the reflected light having a relatively large intensity, and a curve L2 represents a received light signal due to the reflected light having a relatively weak intensity.

The received light signals corresponding to the intensities of the reflected beams are asymmetrical, and the degree of asymmetry increases with an increase in the amplitude of the received light signals. Therefore, the time measuring circuit 88, for example, finds time intervals ($\Delta t1$, $\Delta t2$) between the rising times (t11, t21) and the falling times (t12, t22), which are parameters corresponding to the amplitudes of the received light signals. A time tp at which a peak value is generated is calculated based on the rising times (t11, t21) and the falling times (t12, t22) while taking the time intervals ($\Delta t1$, $\Delta t2$) into consideration.

Thus, the time tp for generating a peak value of voltage signal is calculated and, then, a time difference $\Delta t$ is found between a time t0 at which the laser beam is emitted and a time tp at which the peak value is generated as shown in FIG. 4A. Namely, a drive signal output from the laser radar CPU 70 to the laser diode drive circuit 76, is input to the time measuring circuit 88, and the time t0 of emitting the laser beam can be detected from the drive signal. The time difference $\Delta t$ between the time t0 of generating the laser beam and the time tp of the peak value, is encoded into a binary digital signal and is output to the laser radar CPU 70.

Figure 2C:
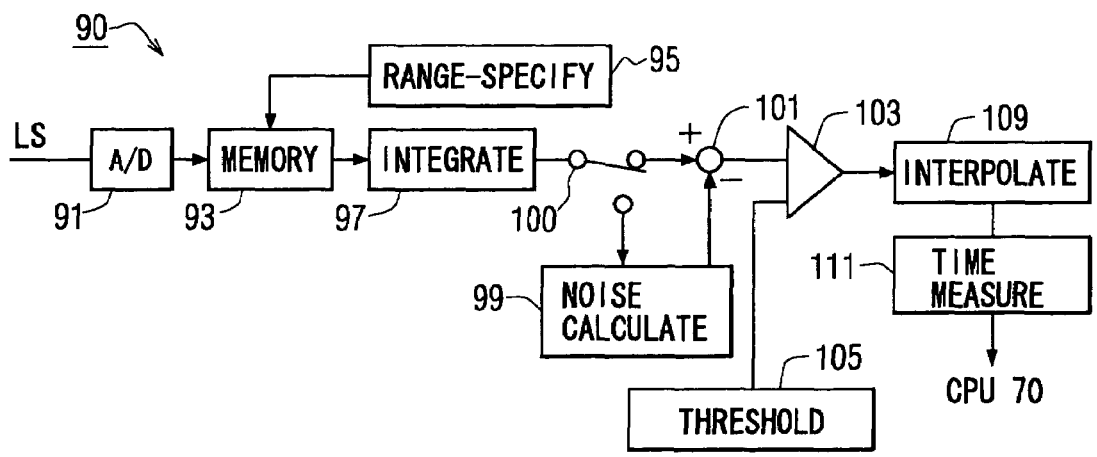
FIG. 2C is a diagram illustrating a second detector circuit in the laser radar sensor.
Figure 5:
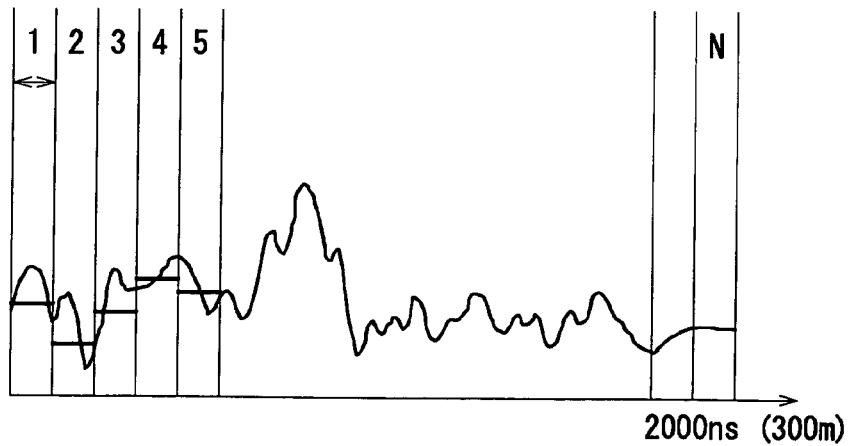
FIG. 5 is a diagram of waveforms illustrating a digital conversion of received light signals by an A/D converter circuit in the second detector circuit.

The second detector circuit 90 includes an analog/digital (A/D) converter circuit 91 as shown in FIG. 2C. The received light signal LS from the amplifier 85 is input to the A/D converter circuit 91 and is converted into a digital signal. The received light signal converted into the digital signal is input to a memory circuit 93 and is stored therein. The received light signal put to the digital conversion is the one output from the amplifier circuit 85 until a predetermined period of time (e.g., 2000 ns) elapses from the time t0 of emitting the laser beam. Referring to FIG. 5, the received light signal LS is divided into N sections each of which is a predetermined time interval (e.g., 10 ns), and an average value of the received light signals of these sections is converted into a digital value.

An integration range-specifying circuit 95 operates to output, to an integrating circuit 97 in a subsequent stage, a predetermined number of received light signals corresponding to a predetermined number of laser beams radiated neighboring to each other in the X-axis direction out of the received light signals stored in the memory circuit 93. The range of received light signals to be integrated specified by the integration range-specifying circuit 95 will now be described with reference to FIGS. 6 and 7.

Figure 6:
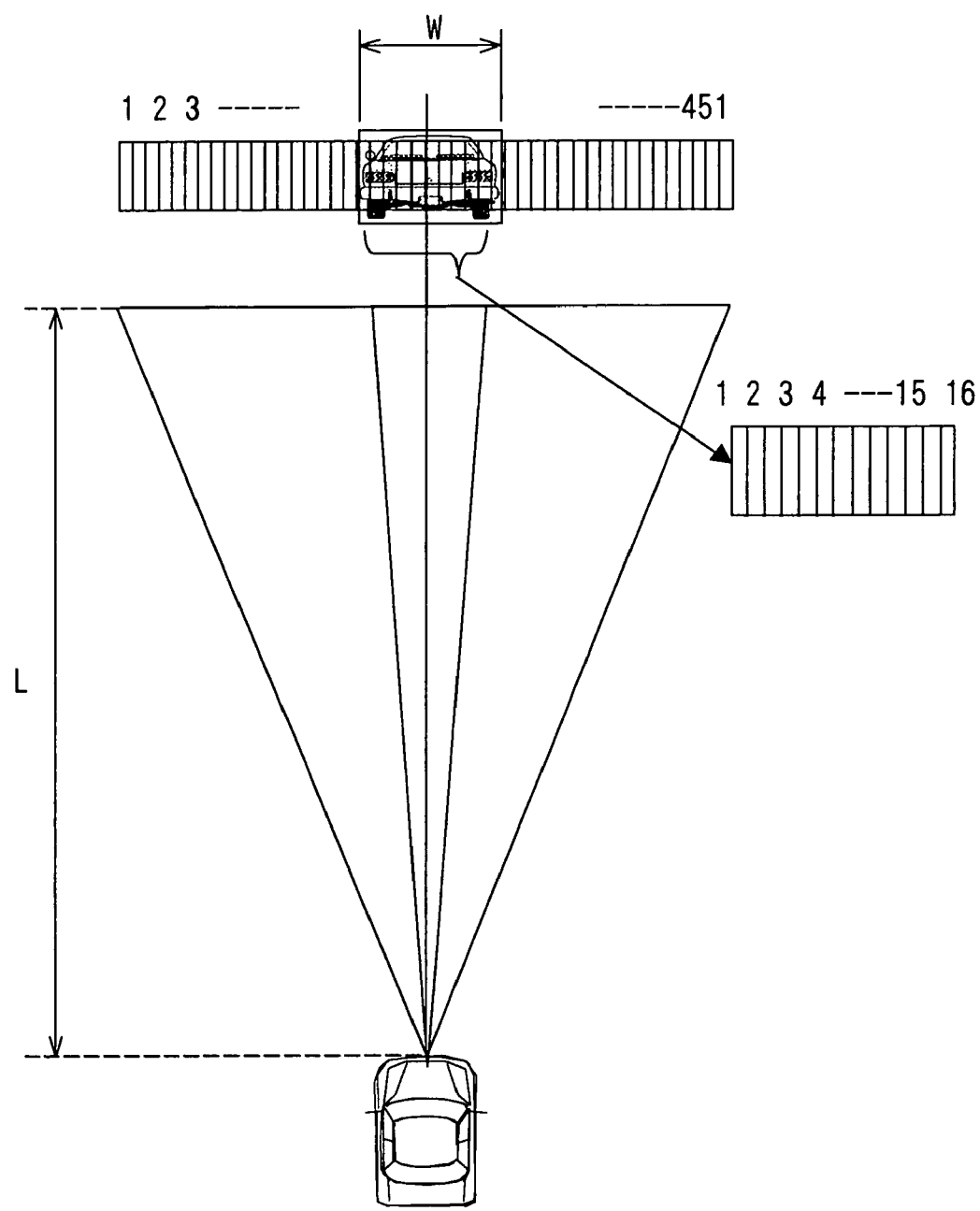
FIG. 6 is a diagram illustrating a method of setting the number of received light signals that are to be integrated.

FIG. 6 illustrates a relationship between the area to which the laser beam is radiated and a preceding vehicle which is the object to be detected. FIG. 6 shows a radiation area of one scanning line only for simplicity.

The preceding vehicle shown in FIG. 6 has a reflector on the rear surface thereof to highly reflect the laser beam. The vehicle body, too, reflects the laser beam relatively highly though it is not as high as that of the reflector. Usually, therefore, the light reflected by the preceding vehicle is sufficiently intense, and the received light signal due to the reflected light is greater than the reference voltage V0 as shown in FIGS. 4A and 4B.

However, when, for example, mud, snow and the like are adhered to the rear surface of the preceding vehicle, the intensity of light reflected by the preceding vehicle drops. Therefore, the received light signal corresponding to the light reflected by the preceding vehicle may often become smaller than the reference voltage V0. When the received light signal does not exceed the reference voltage V0, it is not allowed to detect the preceding vehicle based on the individual received light signals. Besides, the intensity of the reflected waves decreases as the distance to the preceding vehicle increases, and it becomes difficult to detect the preceding vehicle that is distant by more than a predetermined distance based on the individual received light signals.

In this embodiment, therefore, a plurality of received light signals are integrated to amplify the received light signals which are reflected by the preceding vehicle to detect even the reflected waves having small intensities. The integration range-specifying circuit 95 specifies the received light signals that are to be integrated.

It is desired that the number of received light signals to be integrated is determined based on the width of the object to be detected in the direction of vehicle width, the distance L0 to the object that is to be detected, and the beam step angle θ of the laser beam in the direction of vehicle width. That is, the number Nr of the received light signals to be integrated is so selected that the range of radiation of a predetermined number of transmission waves corresponds to the width W of the object to be detected in the direction of vehicle width at the distance L0 that is to be detected. This can be represented by the following numerical formula, $$Nr=W/(L0\times\tan\theta)$$

By setting the number of the received light signals that are to be integrated, there necessarily exists a combination in which all of the received light signals to be integrated become the received light signals that are output when the light reflected by the object to be detected is received in a range of distance with the distance L0 to be detected as an upper limit. In this case, there are integrated only those received light signals containing the received signal components corresponding to the intensities of the reflected waves and, hence, sensitivity of detecting the reflected waves can be efficiently improved based on the integrated signal.

In the example shown in FIG. 6, the transverse width of the preceding vehicle to be detected is about 1.8 m, the distance to be detected is 80 m, and the beam step angle of the laser beam in the direction of vehicle width is 0.08 deg. Therefore, the number of the received light signals to be integrated is selected to be 16.

The integration range-specifying circuit 95 changes the range of received light signals that are to be integrated maintaining a time interval in which the integrating circuit 97 calculates an integrated signal of 16 received light signals, a comparator 103 in a subsequent stage effects the comparison processing by using a threshold value of a threshold circuit 105, an interpolation circuit 109 effects the linear interpolation processing, and a time measuring circuit 111 calculates a time difference $\Delta t$.

Figure 7:
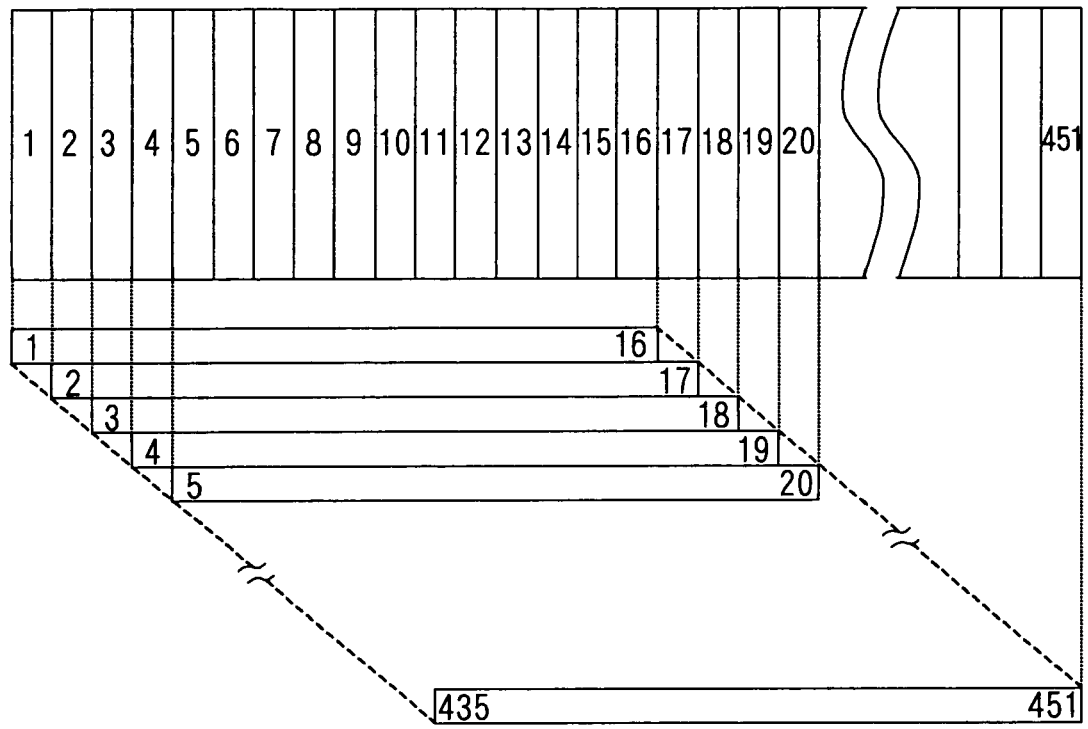
FIG. 7 is a diagram illustrating the motion of a range of received light signals to be integrated by using an integration range-specifying circuit in the second detector circuit.

That is, referring to FIG. 7, numerals of 1 to 451 are imparted to the received light signals to correspond to 451 laser beams that are radiated so as to be scanned from the left toward the right in the direction of X-axis. Then, the integration range-specifying circuit 95 specifies first to sixteenth received light signals as a range of received light signals to be integrated. After the passage of the above time interval, the second to seventeenth received light signals are specified as a range of received light signals to be integrated. Thus, the integration range-specifying circuit 95 changes the range of received light signals to be integrated by an amount of one received light signal each time. This makes it possible to minimize a drop in the angular resolution based on the integrated signals while integrating sixteen received light signals.

That is, when the received light signals output from the light-receiving element 83 are simply grouped in the number of 16 to find an integrated signal, it is possible to improve the sensitivity of detecting the reflected light resulting, however, in a great drop in the angular resolution due to the integrated signals. On the other hand, when the range of received light signals to be integrated is shifted by one received light signal each time as described above, it is possible to suppress a drop in the angular resolution.

Figure 8A:
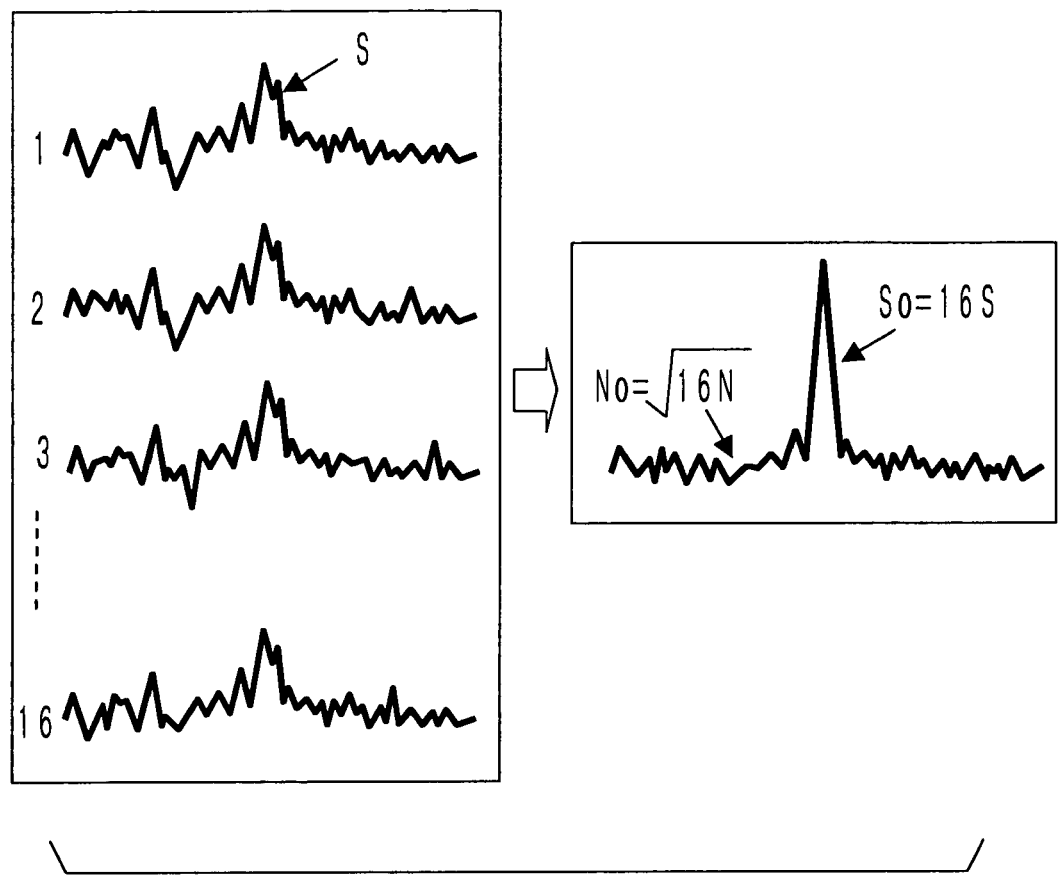
FIG. 8A is a diagram illustrating that a degree of amplification of received light signals corresponding to the intensity of the reflected light becomes greater than a degree of amplification of noise signal components when a plurality of received light signals are integrated.

Sixteen received light signals belonging to a range specified by the integration range-specifying circuit 95 are read out from the memory circuit 93, and are output to the integrating circuit 97. The integrating circuit 97 integrates sixteen received light signals that have been converted into digital signals as shown in FIG. 8A.

Here, when the sixteen received light signals all contain received light signal components S depending upon the waves reflected by the same reflecting object, the received light signal components S appear at a moment when the same period of time has passed from the moment when the laser beam is emitted. Accordingly, the received light signal component S0 in the integrated signal becomes equal to the received light signal component S of each received light signal that is amplified 16 times. On the other hand, the noise component N contained in each received light signal generates in a random fashion due basically to external light. Therefore, even when 16 received light signals are integrated, the noise component N0 is simply amplified to square root of 16 ($\sqrt{16}$) that is 4 times. Upon calculating the integrated signals by the integrating circuit 97, therefore, the ratio (S/N ratio) of the received light signal component S0 and the noise component N0 increases 4 times. Therefore, even when the received light signal components S contained in the individual received light signals are so small that it is difficult to make a distinction over the noise component N, use of the above integrated signals makes it possible to detect the reflecting object based on the amplified received light signal component S0.

In FIG. 2C, reference numeral 100 denotes a switching circuit which changes the output of the integrating circuit 97 over to the comparator 103 and to the background noise calculation circuit 99. When the laser beam has not been radiated onto the scanning area shown in FIG. 3, the background noise calculation circuit 99 calculates noise components superposed on the received light signals based on the integrated signal output from the integrating circuit 97.

In this embodiment, the laser beam is scanned in the directions of X-axis and Y-axis by having 451 laser beams reflected by the mirrors of the polygonal mirror 73 having six mirrors on the outer periphery thereof with different plane tilting angles. When the six mirrors are changed over by the turn of the polygonal mirror 73, the laser beams reflected by the mirrors are shielded by the frame of a radiation window that is not shown, and are not radiated to the external side. At the time of changing over the six mirrors of the polygonal mirror 73, the switching circuit 100 changes the output of the integrating circuit 97 over to the background noise calculation circuit.

At this moment, the received light signal components S corresponding to the waves reflected by the reflecting object are not contained in the received light signals that are integrated by the integrating circuit 97. Therefore, the integrated signal output from the integrating circuit 97 shows a noise component N to be superposed on the received light signals. Therefore, the noise component N is removed from the integrated signal through a subtraction circuit 101 that will be described later to further improve the S/N ratio of the integrated signal.

The noise component is calculated based on the integrated signal output from the integrating circuit 97 while the laser beam is being emitted (but is not radiated to the external side) because of the reason that the electromagnetic noise is generated by the emission of laser beam and is often superposed on the received light signals.

Further, when the laser beam is not being radiated onto the scanning area shown in FIG. 3, the integrating circuit 97 produces a plurality of integrated signals. The background noise calculation circuit 99 averages the plurality of integrated signals to calculate an averaged integrated signal. The averaging processing may be to simply average a plurality of integrated signals or to calculate a weighted mean. Upon averaging the integrated signals of the received signals due to noise components N, noise components having regularity appear characteristically on the averaged integrated signals.

That is, the noise components superposed on the received light signals basically generate in a random fashion. Among them, however, there are contained noise components having regularity being affected by electromagnetic wave noises due to clock pulses of the laser radar CPU 70 and the emission of laser beams. When the averaging processing is repeated, the noise components having regularity are more emphasized than the random noise components. The noise components having regularity are necessarily contained in the integrated signals. Therefore, the noise components are found by the averaging processing through the background noise calculation circuit, and the averaged noise components are removed from the integrated signals to reliably remove the noise components having regularity from the integrated signals.

In FIG. 2C, reference numeral 101 denotes a subtraction circuit which, when a laser beam is being radiated onto the scanning area, subtracts the noise component calculated by the background noise calculation circuit 99 from the integrated signal output of the integrating circuit 97. The integrated signal from which the noise component is subtracted is compared by a comparator 103 with a threshold value Vd output from a threshold value-setting circuit 105. The threshold value Vd corresponds to the reference voltage V0 described with reference to FIG. 2B.

Figure 9:
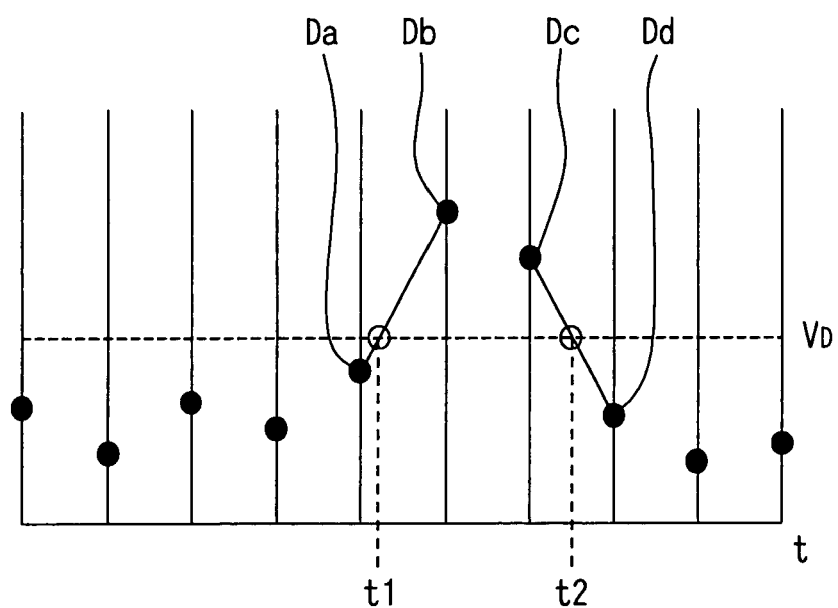
FIG. 9 is a diagram of waveforms illustrating linear interpolation processing effected by an interpolation circuit of the second detector circuit.

Referring to FIG. 9, the digital values discretely calculated maintaining a predetermined time interval are compared with the threshold value VD corresponding to the reference voltage V0. Here, when, for example, the digital values Db and Dc are larger than the threshold value VD, the result of comparison is output to an interpolating circuit 109.

The interpolating circuit 109 finds a rising time t1 and a falling time t2 at which it is estimated that the threshold value is traversed by linear interpolation. That is, a straight line is imagined connecting the digital value Db in excess of the threshold value to a digital value Da that is just preceding, and a time corresponding to a point where the straight line intersects the threshold value VD is found and is regarded to be the rising time t1. Similarly, a straight line is imagined connecting the digital value Dc in excess of the threshold value VD to a digital value Dd that is just succeeding, and a time corresponding to a point where the straight line intersects the threshold value is found and is regarded to be the falling time t2.

Figure 8B:
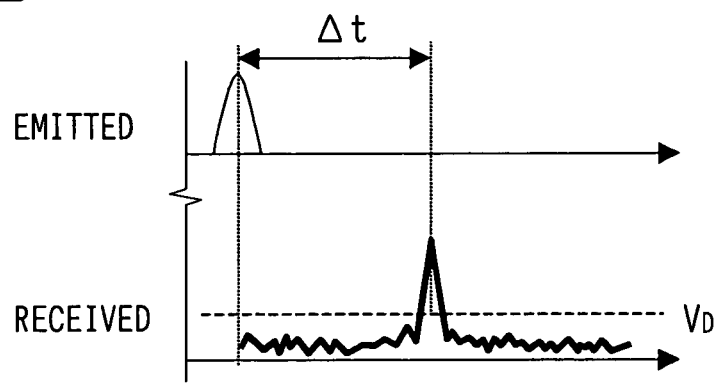
FIG. 8B is a diagram of waveforms illustrating a principle for detecting a distance to a reflecting object based on the integrated signal.

A time measuring circuit 111 executes the same processing as that of the time measuring circuit 88 of FIG. 2B, finds a time of generating a peak value in the received light signal component S based on the rising time t1 and the falling time t2 as shown in FIG. 8B, and calculates the time difference Δt between the time of emitting the laser beam and the time of emitting the peak value as shown in FIG. 8B.

Based on the time differences Δt input from the time measuring circuits 88 and 111, the laser radar CPU 70 calculates a distance to the reflecting object, and prepares position data based on the distance and the scanning angles θx and θy of the corresponding laserbeams. Specifically, position data of the reflecting object are found from the distance and the scanning angles θx and θy on an X-Y-Z rectangular coordinate system with the center of laser radar as an origin (0, 0, 0), the direction of car width as X-axis, the direction of car height as Y-axis, and the direction toward the front of the vehicle as Z-axis. The position data in the XYZ rectangular coordinate system are output as distance data to the recognition/inter-vehicle distance ECU 3.

When the distance to the reflecting object is to be calculated based on the integrated signal, the scanning angle θx of the laser beam corresponding to the integrated signal is the scanning angle θx of the laser beam at the central position among the plurality of laser beams corresponding to the plurality of integrated received light signals.

The recognition/inter-vehicle distance ECU 3 controls the inter-vehicle distance by recognizing the object based on the distance data from the laser radar sensor 5, and by controlling the vehicle speed by sending drive signals to the brake drive unit 19, throttle drive unit 21 and automatic transmission control unit 23 to meet the conditions of the preceding vehicle obtained from the recognized object. An alarm determining processing is also executed to produce an alarm in case the recognized object is staying in a predetermined alarm region for longer than a predetermined period of time. The object in this case may be a vehicle traveling in front or a vehicle that is at rest ahead.

The internal construction of the recognition/inter-vehicle distance ECU 3 will now be briefly described as a control block. The distance data output from the laser radar sensor 5 are sent to an object recognizing block 43. Based on the three-dimensional position data obtained as the distance data, the object recognizing block 43 finds a central position (X, Y, Z) of the object, and a size (W, D, H) of the object such as width W, depth D and height H. Based on a change in the central position (X, Y, Z) with the passage of time, further, a relative speed (Vx, Vy, Vz) of the object is found with the position of the own vehicle as a reference.

The object recognizing block 43 further discriminates whether the object is at rest or is moving based on the vehicle speed (speed of the own vehicle) output from the vehicle speed calculation block 47 based on the value detected by the vehicle speed sensor 7 and upon the relative speed (Vx, Vy, Vz) found above. Based on the result of discrimination and the central position of the object, objects are selected that affect the traveling of the own vehicle, and the distances are displayed on the distance display unit 15.

Further, based on a signal from the steering sensor 27, a steering angle calculation block 49 finds a steering angle and based upon a signal from the yaw rate sensor 28, a yaw rate calculation block 51 calculates a yaw rate. Further, a curve radius (radius of curvature) calculation block 57 calculates a radius of curve (radius of curvature) R based on the vehicle speed from the vehicle speed calculation block 47, the steering angle from the steering angle calculation block 49 and the yaw rate from the yaw rate calculation block 51.

Based on the curve radius R, central position coordinate (X, Z), etc., the object recognizing block 43 determines the probability in that the object is a vehicle and the probability in that the object is traveling in the same lane as the own vehicle. An abnormal sensor detector block 44 detects any abnormal value of data found by the object recognizing block 43. When the data have abnormal values, this fact is displayed on an abnormal sensor display unit 17.

A block 53 for determining the preceding vehicle selects the preceding vehicle based on a variety of data obtained from the object recognizing block 43, and finds a distance Z to the preceding vehicle in the direction of Z-axis and a relative speed Vz. Then, a block 55 for controlling the inter-vehicle distance and for determining the alarm determines whether an alarm be produced when it is the alarm determination or determines the content of vehicle speed control when it is the cruise determination, based on the distance Z to the preceding vehicle, relative speed Vz, preset state of the cruise control switch 26, state in which the brake switch 9 is depressed, opening degree from a throttle opening sensor 11 and a sensitivity set point value by an alarm sensitivity setting unit 25.

When the alarm must be produced, an alarm generating signal is output to an alarm sound generator 13. When it is the cruise determination, control signals are sent to the automatic transmission control unit 23, to the brake drive unit 19 and to the throttle drive unit 21 to effect the required control operations. When these control operations are executed, required display signals are output to the distance display unit 15 to notify the conditions to the driver.

According to this embodiment as described above, an integrated signal is calculated by integrating a plurality of received light signals to thereby detect the reflecting object even by using the integrated signal in addition to detecting the reflecting object based on the individual received light signals. It is therefore made possible to detect the reflecting object at a distance that cannot be detected by using the individual received light signals or to detect the reflecting object that reflects light little.

The present invention is in no way limited to the above embodiment only but can be put into practice in the following forms without departing from the spirit and scope of the invention.

(1) In the above embodiment, the integration range-specifying circuit 95 changes the range of the received light signals that are to be integrated by one received light signal each time. However, the integration range-specifying circuit 95 may change the range of received light signals to be integrated by a plurality of received light signals within a range which is smaller than the number of the received light signals to be integrated. In this case, too, it is possible to improve the angular resolution of the integrated signals as compared to when the integrated signals are found by at least grouping a predetermined number of received signals.

(2) In the above embodiment, the integration range-specifying circuit 95 in the second detector circuit 90 specifies the number of the received signals to be integrated of only one kind (16 signals). The number of the received signals to be integrated is determined depending upon the distance L0 to be detected as represented by the above formula of Nr.

Therefore, there may be set two or more distances L0 to be detected, and there may be specified the numbers of the received signals to be integrated of two or more kinds. In this case, the constructions of from the integrating circuit 97 to the time measuring circuit 111 are connected in parallel to the memory circuit 93 by the number of kinds of the received signals to be integrated. This makes it possible to calculate a plurality of integrated signals having different numbers of integration as well as to execute the subsequent arithmetic processing in parallel and concurrently.

The above construction makes it possible to set a plurality of distances and ranges to the same object (preceding vehicle) to be detected to obtain an improved sensitivity for detecting the reflected light.

(3) In the above embodiment, the first detector circuit 86 and the second detector circuit 90 operate to detect the reflecting object independently based on the individual received light signals and based on the integrated signals obtained by integrating a plurality of received light signals.

However, when the reflecting object is detected based on the individual received light signals, i.e., when it is detected that the individual received light signals have amplitudes greater than the reference voltage V0, the integration range-specifying circuit 95 may receive the data for specifying the received light signals such as the numbers of the received light signals from the laser radar CPU 70 or the first detector circuit 80 to exclude such received light signals from the received light signals that are to be integrated.

The reason for utilizing the integrated signals of the received light signals is for detecting the reflecting object even when the individual received light signals fail to have intensities (amplitudes) large enough for identifying the reflecting object. When the individual received light signals have intensities (amplitudes) large enough for detecting the reflecting object, then, there is no need of finding the integrated signals. Further, the angular resolution is more improved when the reflecting object is detected based on the individual received light signals than when the reflecting object is detected based on the integrated signals. Because of these reasons, when the reflecting object can be detected by the individual received light signals, then, the distance data related to the reflecting object should be calculated based on the detected results.

It is further possible to decrease the amount of arithmetic processing and to shorten the time of operation by setting a range of the received signals to be integrated for those received light signals excluding the received light signals having amplitudes large enough for detecting the reflecting object.

(4) In the above embodiment, the first detector circuit 86 and the second detector circuit 90 are constructed as hard logic circuits. However, part of them can be realized by using a software in the laser radar CPU 70. Conversely, a hard logic circuit can be employed for realizing the processing of the laser radar CPU 70 for finding a distance to the reflecting object from the time difference $\Delta t$ between the time t0 for emitting the laser beam and the time tp for generating a peak value in the received light signal.

(5) The above embodiment has dealt with an example of integrating the received light signals based on a plurality of laser beams radiated neighboring each other on each scanning line in the direction of X-axis. However, not being limited to the laser beams radiated neighboring each other in the direction of X-axis, the received light signals to be integrated may be those of the laser beams radiated neighboring each other in the direction of Y-axis. Further, the range of laser beams radiated neighboring each other may cover a plurality of scanning lines of X-axis and Y-axis.

(6) The above embodiment uses the polygonal mirror 73 having different plane tilting angles for effecting the two-dimensional scanning of the laser beams. The embodiment, however, can similarly be realized even by using, for example, a galvanic mirror capable of scanning the direction of vehicle width and varying the tilting angles of the mirror planes. The polygonal mirror 73, however, offers such an advantage that the two-dimensional scanning can be realized by the rotary drive only.

(7) In the above embodiment, the laser radar sensor 5 converts the distance and the corresponding scanning angles $\theta x$, $\theta y$ from those of the polar coordinate system into those of the X-Y-Z rectangular coordinate system. The processing thereof, however, may be executed by the object recognizing block 43.

(8) The above embodiment employs the laser radar sensor 5 that uses laser beams. However, there may be used electromagnetic waves such as millimeter waves or ultrasonic waves. Not being limited to the scanning system only, however, there may be employed any system capable of measuring the azimuth in addition to the distance. When, for example, an FMCW radar or a Doppler radar is used with millimeter waves, there are obtained at one time the distance data to the preceding vehicle and the data related to the relative speed from the reflected waves (received waves). Unlike the case of using laser beams, therefore, no step is required for calculating the relative speed based on the distance data.

Further modifications and alterations are also possible without departing from the spirit and scope of the present invention.

What is claimed is:

1. A vehicle radar device comprising:
   radar means for radiating a plurality of transmission waves in at least a direction of width of a vehicle over a predetermined angular range and for producing received signals corresponding to intensities of reflected waves when reflected waves corresponding to the transmission waves are received;

setting means for setting a range of the received signals to be integrated including a predetermined number of received signals output based on the predetermined number of transmission signals radiated from the radar means neighboring each other, and for setting a plurality of ranges of the received signals to be integrated while shifting the received signals belonging to the ranges of the received signals to be integrated by a number of the received signals smaller than the predetermined number, so that some of the received signals belong, in an overlapped manner, to the plurality of ranges of the received signals to be integrated;

integrating means for integrating the predetermined number of the received signals belonging to the plurality of ranges of the received signals to be integrated set by the setting means, and for producing integrated signals; and detector means for comparing integrated signals output from the integrating means with a predetermined reference integrated value, and for detecting a reflecting object based on the integrated signals which are greater than the reference integrated value.

2. The vehicle radar device according to claim 1, wherein the setting means sets a plurality of ranges of the received signals to be integrated while shifting the received signals belonging to the ranges of the received signals to be integrated one by one.

3. The vehicle radar device according to claim 1, wherein the number of the received signals belonging to the range of the received signals to be integrated is determined by $Nr=W/(L0 \times \tan \theta)$, wherein W is a length of an object to be detected in the direction of the vehicle width, L0 is a length to be detected up to the object to be detected, and $\theta$ is a beam step angle of the transmitted waves in the direction of vehicle width.

4. The vehicle radar device according to claim 1, wherein the setting means sets a first range of the received signals to be integrated including a first predetermined number of the received signals belonging thereto, and a second range of the received signals to be integrated including a second predetermined number of the received signals belonging thereto, the second predetermined number being different from the first predetermined number.

5. The vehicle radar device according to claim 1, further comprising:

noise component calculation means which, when the transmission waves are not being radiated over the predetermined angular range, calculates noise components superposed on the received signals based upon the signals output from the radar means; and removing means which removes the noise components from the integrated signals.

6. The vehicle radar device according to claim 5, wherein the noise components are calculated by averaging a plurality of signals output from the radar means when the transmission waves are not being radiated over the predetermined angular range.

7. The vehicle radar device according to claim 1, wherein the detector means compares the received signals output from the radar means with a predetermined reference value and detects the reflecting object based upon the received signals which are larger than the reference value, and the setting means sets the range of the received signals to be integrated for the received signals excluding the received signals which are larger than the reference value.

8. The vehicle radar device according to claim 1, wherein the detector means detects the distance to the reflecting object and the angle in the direction of vehicle width, the angle in the direction of vehicle width being detected from a central angle in a range of radiating the predetermined number of transmission waves corresponding to the range of the received signals to be integrated in which the integrated signals are larger than the reference value.

9. A method of detecting an object by a vehicle radar device, the method comprising:

radiating a plurality of transmission waves from a vehicle to scan a front area of the vehicle in a width direction of the vehicle over a first predetermined range, while changing a position of scanning in a height direction of the vehicle after each scanning in the width direction;

producing received signals corresponding to intensities of reflected waves from a reflecting object in the front area;

integrating the received signals by limiting the number of successively received signals to be integrated to a second predetermined range smaller than the first predetermined range, and by shifting the second range in the width direction by a third predetermined range smaller than the second predetermined range when the position of scanning is changed in the height direction while maintaining overlapping of the second predetermined range among scanning changed in the height direction; and comparing an integrated value of the received signals with a predetermined reference value to detect the reflecting object based on a comparison result.

10. The method according to claim 9, further comprising:

calculating, when the transmission waves are not being radiated over the predetermined range, noise components superposed on the received; and removing the noise components from the integrated signals.

11. The method according to claim 10, wherein the noise components are calculated by averaging a plurality of received signals when the transmission waves are not being radiated over the predetermined range.

12. The method according to claim 9, wherein the comparing detects the reflecting object based upon the received signals being larger than the predetermined reference value, and the range of the received signals to be integrated for the received signals excludes the received signals which are larger than the predetermined reference value.

13. The method according to claim 9, further comprising detecting the distance to the reflecting object and the angle in the direction of vehicle width, the angle in the direction of vehicle width being detected from a central angle in a range of radiating the predetermined number of transmission waves corresponding to the range of the received signals to be integrated in which the integrated signals are larger than the predetermined reference value.

* * * * *